United States Patent
Inoue et al.

(10) Patent No.: US 8,781,407 B2
(45) Date of Patent: Jul. 15, 2014

(54) ANTENNA EQUIPMENT INCLUDING THE GROUPING OF ANTENNA ELEMENTS ACCORDING TO COMMUNICATION TYPES

(75) Inventors: Yuki Inoue, Yokohama (JP); Keizo Cho, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 133 days.

(21) Appl. No.: 13/207,561

(22) Filed: Aug. 11, 2011

(65) Prior Publication Data
US 2012/0046001 A1   Feb. 23, 2012

(30) Foreign Application Priority Data

Aug. 18, 2010   (JP) ................................. 2010-183188

(51) Int. Cl.
*H04B 1/38*   (2006.01)

(52) U.S. Cl.
USPC .......... 455/73; 455/101; 455/129; 455/562.1; 375/267; 375/299; 375/347

(58) Field of Classification Search
USPC .............. 455/73, 13.3, 13.4, 101, 129, 562.1, 455/575.7; 370/252, 278, 236; 375/148, 375/216, 267, 299, 347
See application file for complete search history.

(56) References Cited

U.S. PATENT DOCUMENTS

| | | | |
|---|---|---|---|
| 7,069,050 B2 | 6/2006 | Yoshida | |
| 2004/0009755 A1* | 1/2004 | Yoshida | 455/101 |
| 2008/0069038 A1* | 3/2008 | Yamamoto et al. | 370/328 |
| 2009/0232191 A1* | 9/2009 | Gupta et al. | 375/216 |
| 2010/0329378 A1* | 12/2010 | Leung | 375/267 |

FOREIGN PATENT DOCUMENTS

| | | |
|---|---|---|
| JP | 11-298225 A | 10/1999 |
| JP | 2003-338781 | 11/2003 |
| JP | 2005-136492 A | 5/2005 |
| JP | 2010-68378 | 3/2010 |

OTHER PUBLICATIONS

Ryo Shirai, "MIMO increases the transmission rate several-fold", URL:http://itpro.nikkeibp.co.jp/article/COLUMN/20071203/ 288625/, with Full English Translation, Dec. 13, 2007, 5 pages.
Japanese Office Action issued May 8, 2012 in patent application No. 2010-183188 with English translation.
Office Action issued on Nov. 4, 2013 in Chinese Patent Application No. 201110238673.7.
Office Action issued on Apr. 3, 2014 in Chinese Patent Application No. 201110238673.7 and its English translation.

* cited by examiner

*Primary Examiner* — Shaima Q Aminzay
(74) *Attorney, Agent, or Firm* — Oblon, Spivak, McClelland, Maier & Neustadt, L.L.P.

(57) ABSTRACT

An antenna equipment includes an array antenna including a plurality of antenna elements configured to be grouped into at least one group according to each of N communication types, where N is an integer greater than or equal to 2, a selecting part selecting one of the N communication types, a transmitting part modulating outgoing data to generate an outgoing signal for antenna element or antenna elements belonging to each group for the selected communication type, and a receiving part demodulating an incoming signal from antenna element or antenna elements belonging to each group for the selected communication type to generate incoming data.

5 Claims, 17 Drawing Sheets

US 8,781,407 B2

1

ANTENNA EQUIPMENT INCLUDING THE GROUPING OF ANTENNA ELEMENTS ACCORDING TO COMMUNICATION TYPES

TECHNICAL FIELD

The present invention relates to an antenna equipment used at wireless communication base stations and the like.

BACKGROUND ART

There are communication schemes that use multiple antennas. Example of such communication schemes includes MIMO (multiple-input multiple-output) transmission, communications using antenna diversity, and communications using beam forming. (For example, see "MIMO increases the transmission rate several-fold", published on the Internet on Dec. 13, 2007 (retrieved on Aug. 5, 2010), <URL: http://itpro.nikkeibp.co.jp/article/COLUMN/20071203/288625/>).

For such a multi-antenna communication scheme, as many antennas as required for the multi-antenna communication have been installed.

However, it is difficult to install a required number of antennas for multi-antenna communication if available installation space is limited.

SUMMARY OF THE INVENTION

To solve the problem, an antenna equipment according to one aspect of the present invention includes an array antenna including a plurality of antenna elements configured to be grouped into at least one group according to each of N communication types, where N is an integer greater than or equal to 2. The antenna equipment also includes a selecting part selecting one of the N communication types, a transmitting part modulating outgoing data to generate an outgoing signal for antenna element or antenna elements belonging to each group for the selected communication type, and a receiving part demodulating an incoming signal from antenna element or antenna elements belonging to each group for the selected communication type to generate incoming data.

Effects of the Invention

The same array antenna is used for communications of different types, thereby eliminating the need for installing a required number of antennas for the communications. That is, fewer antennas need to be installed than before.

2

Figure 7:
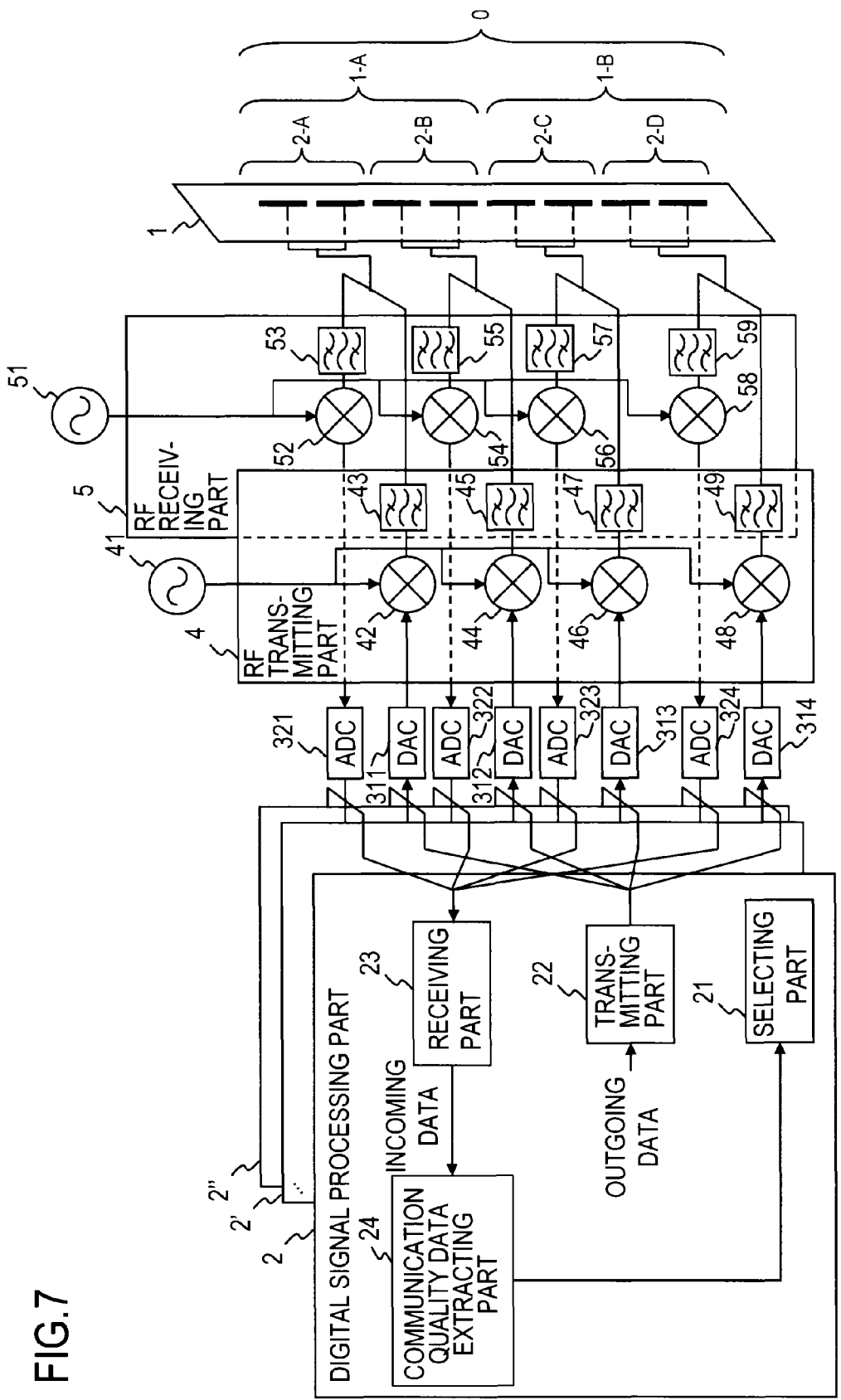
Figure 8:
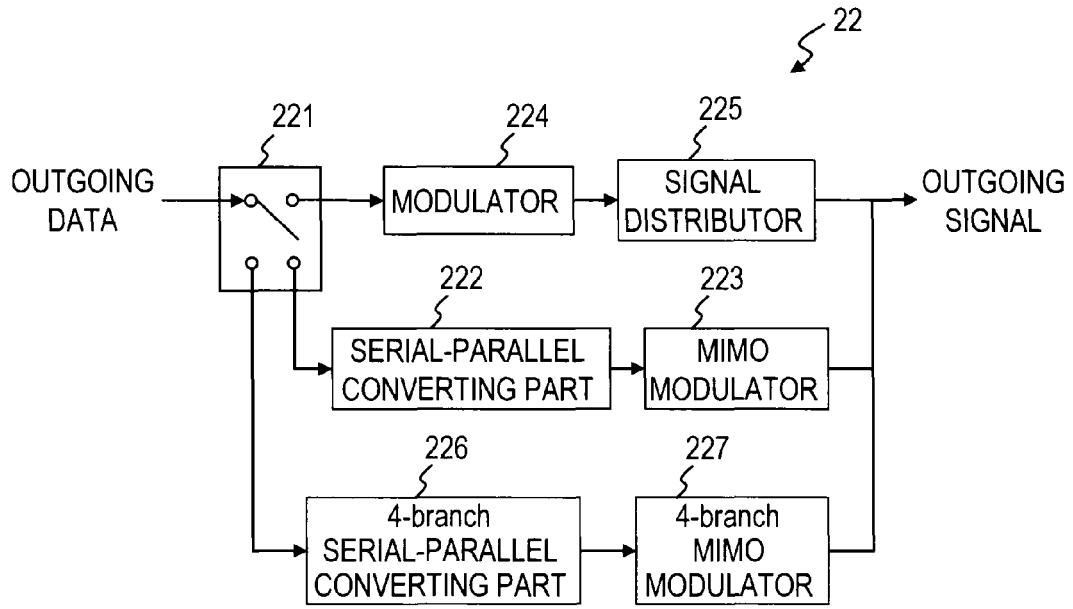
Figure 9:
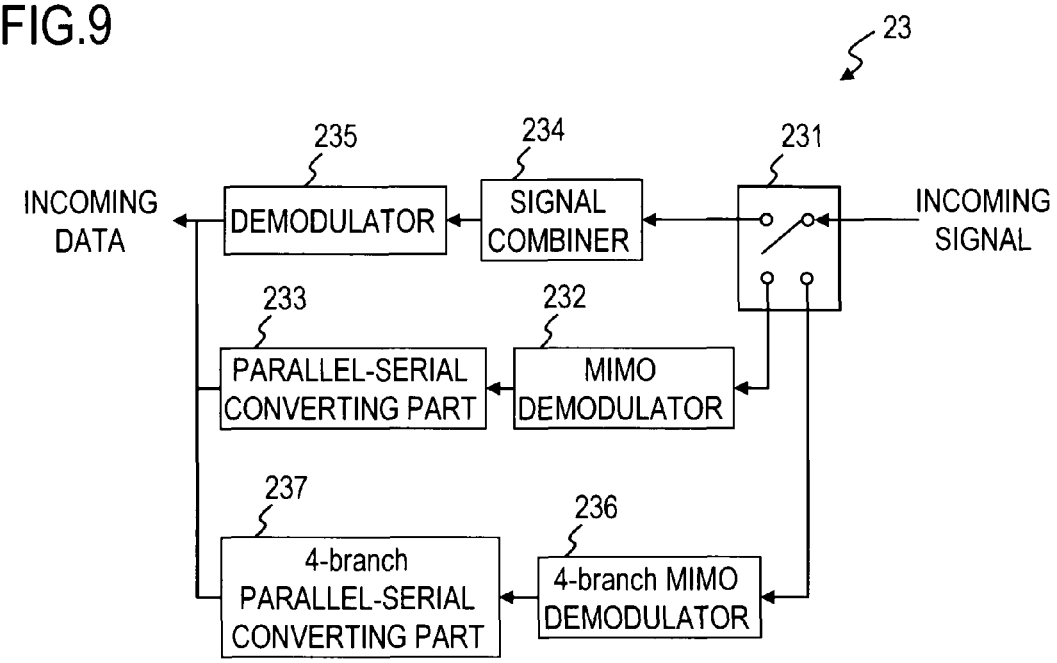
Figure 10:
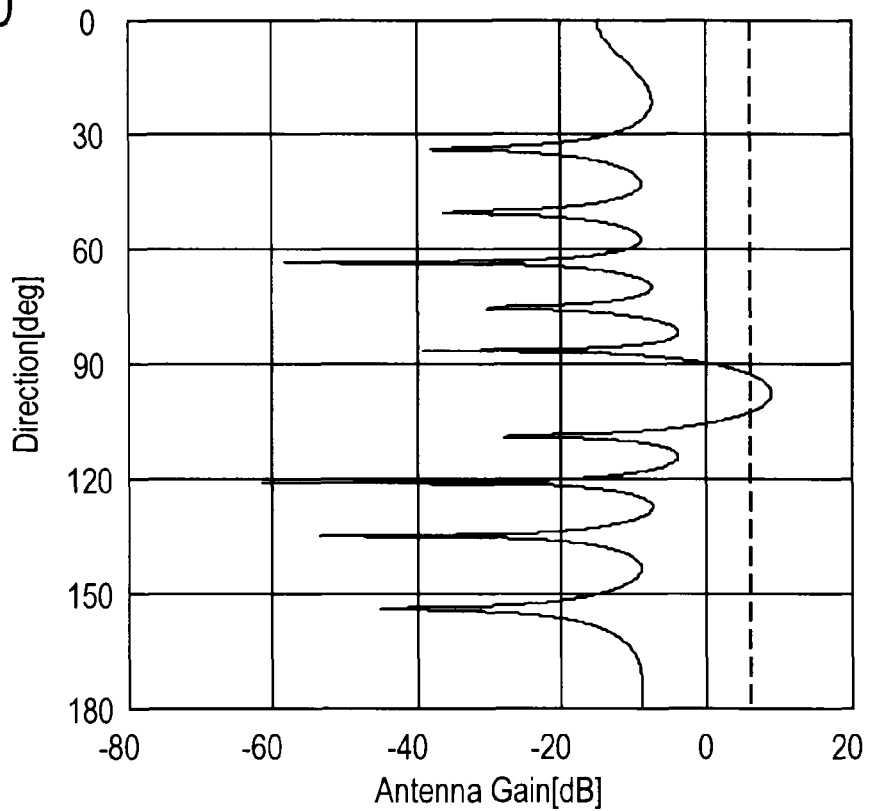
Figure 11:
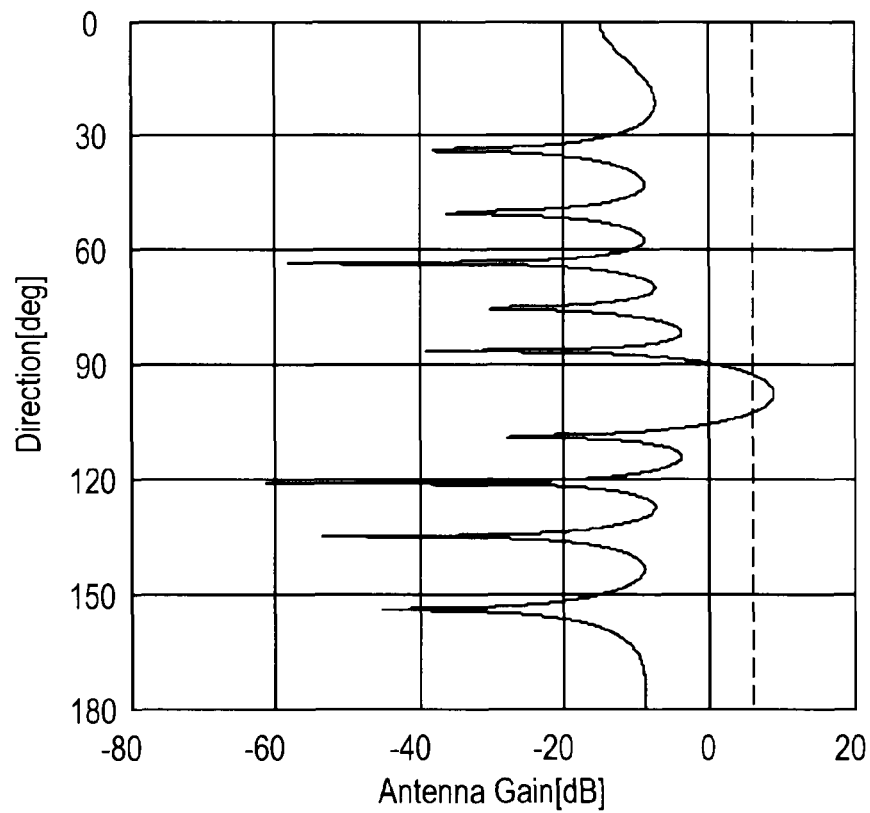
Figure 12:
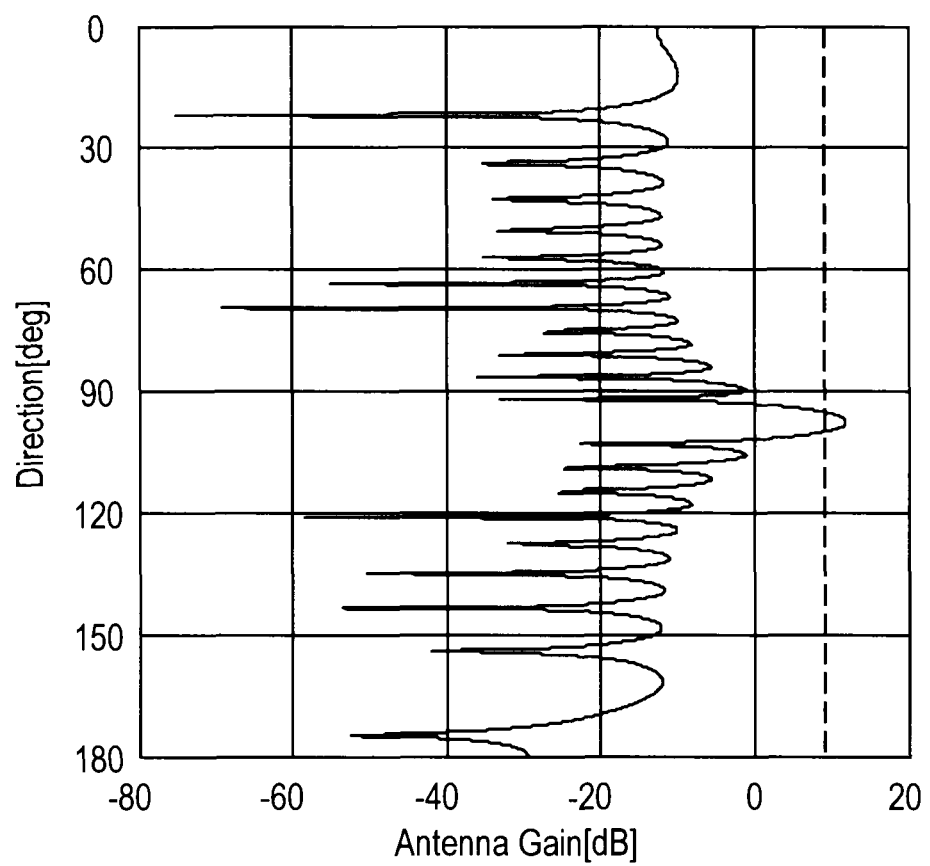
Figure 13:
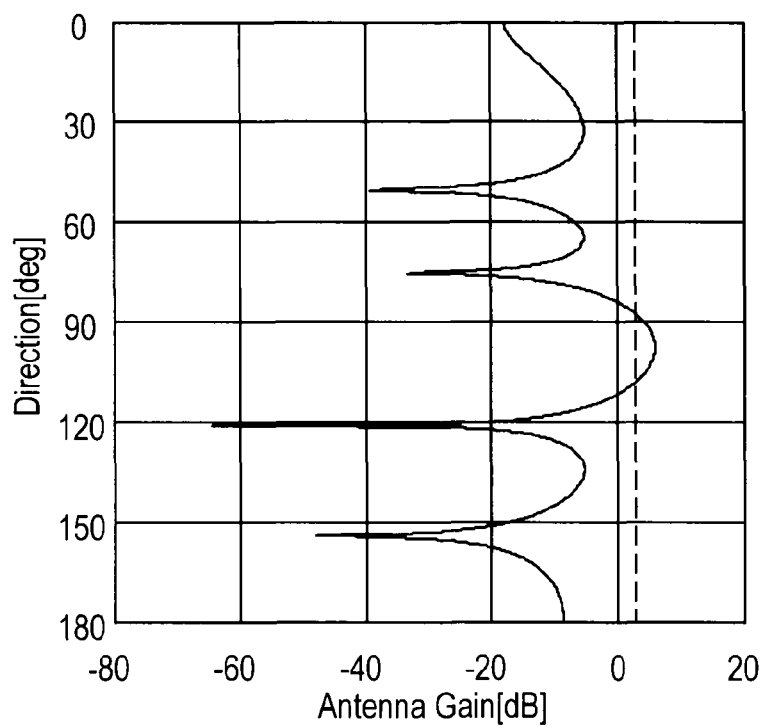
Figure 14:
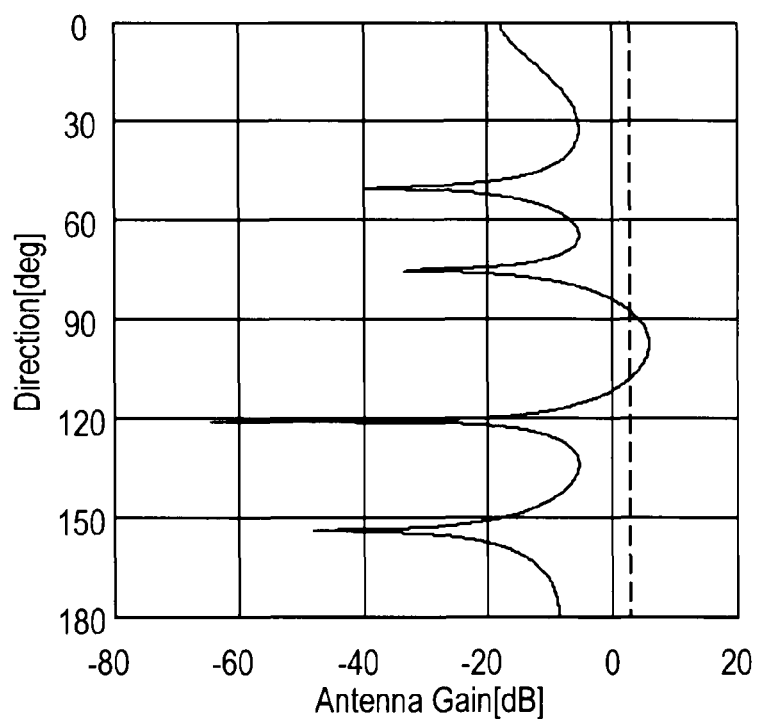
Figure 15:
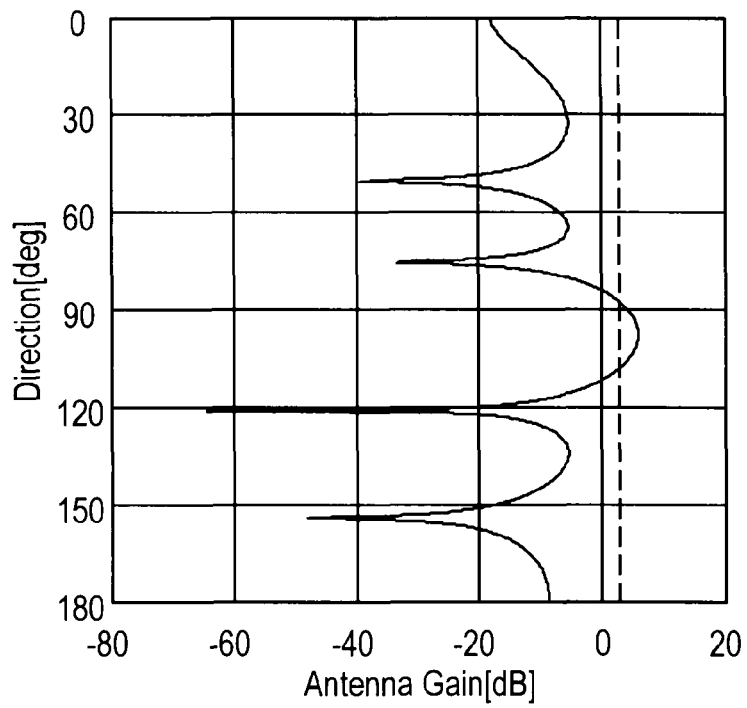
Figure 16:
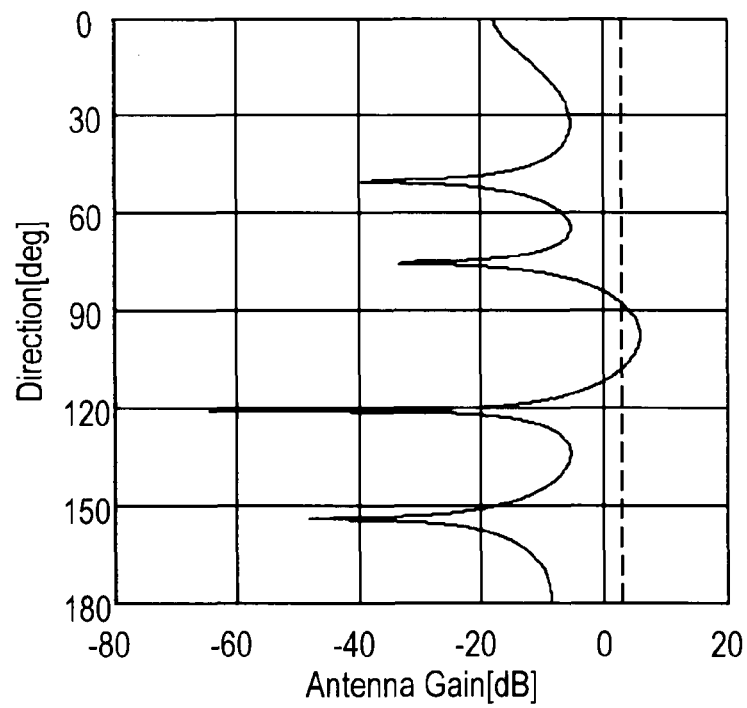
Figure 17:
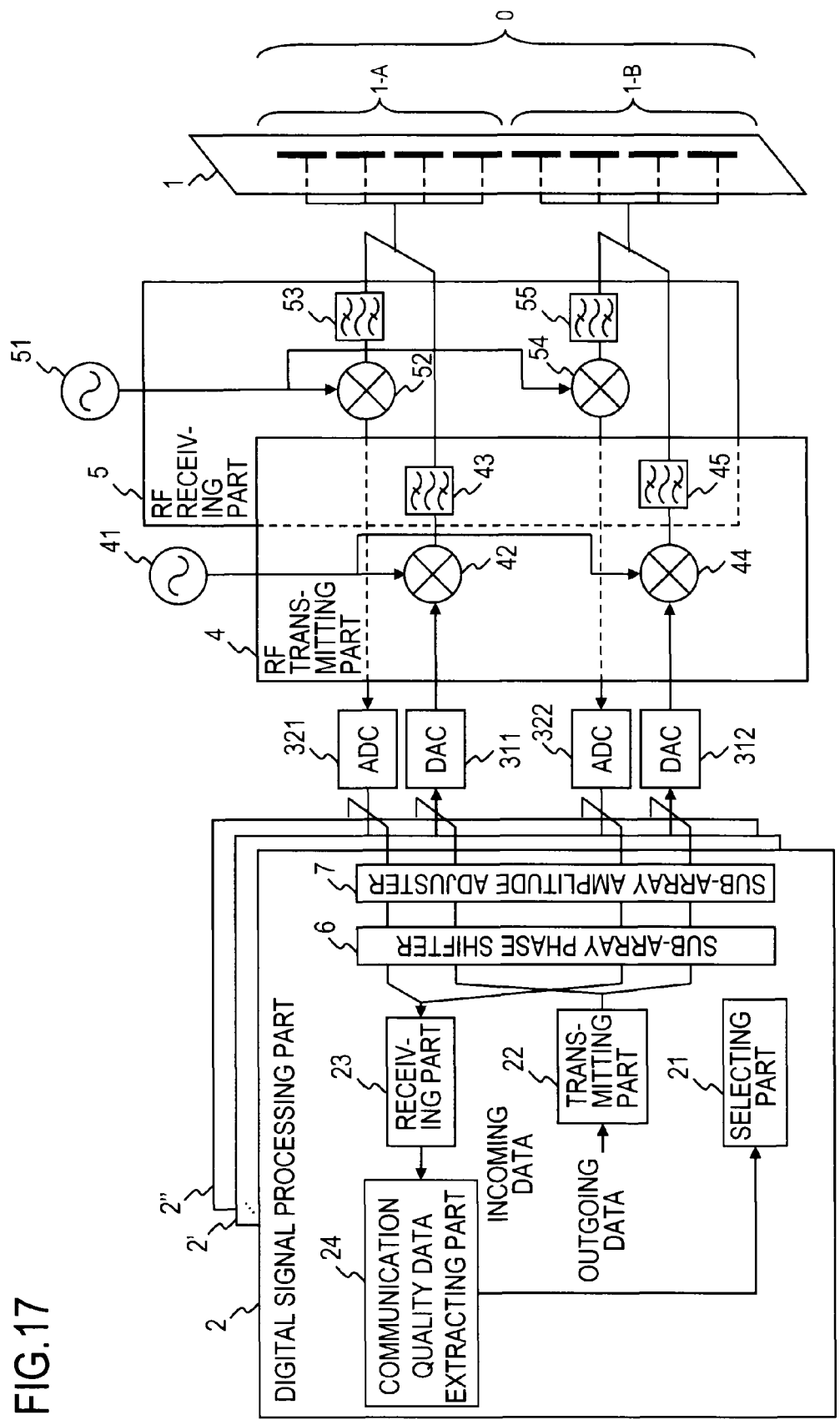
Figure 18:
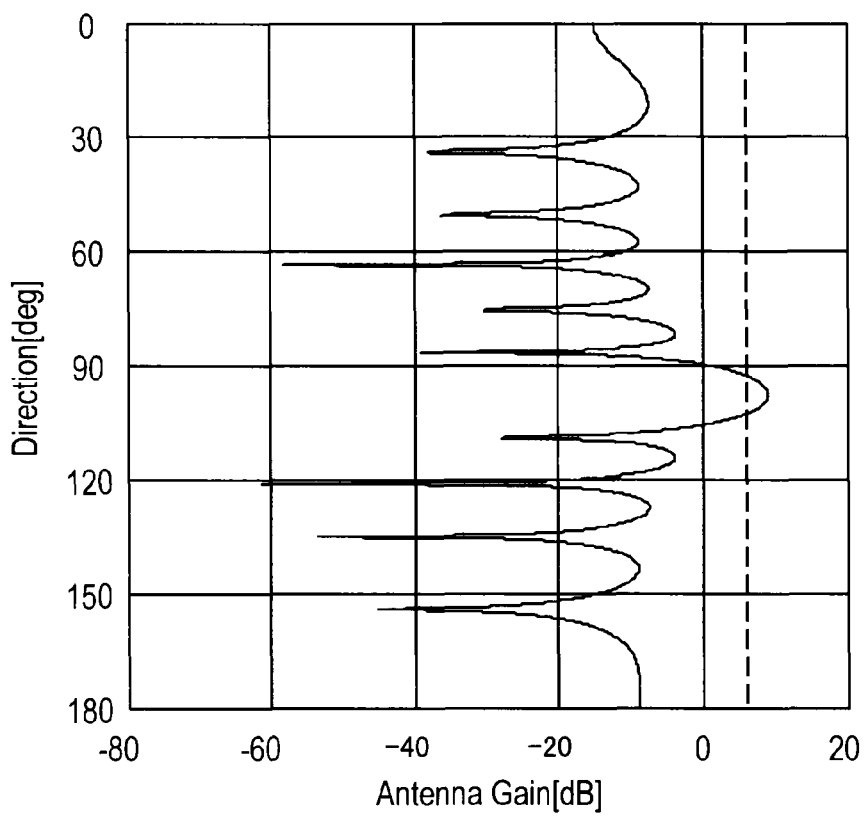
Figure 19:
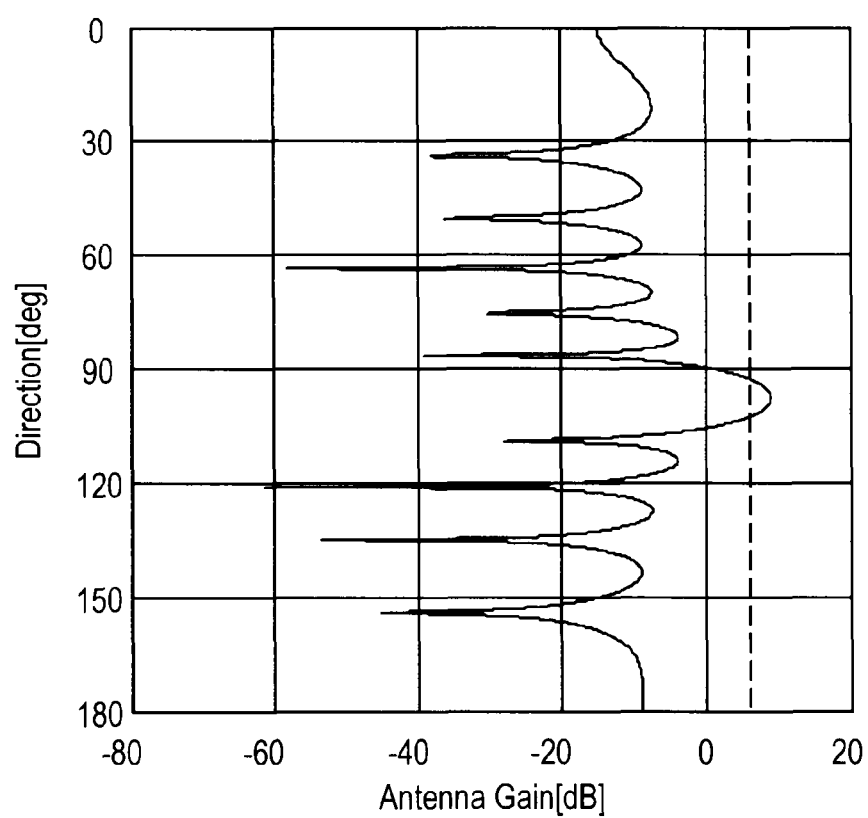
Figure 20:
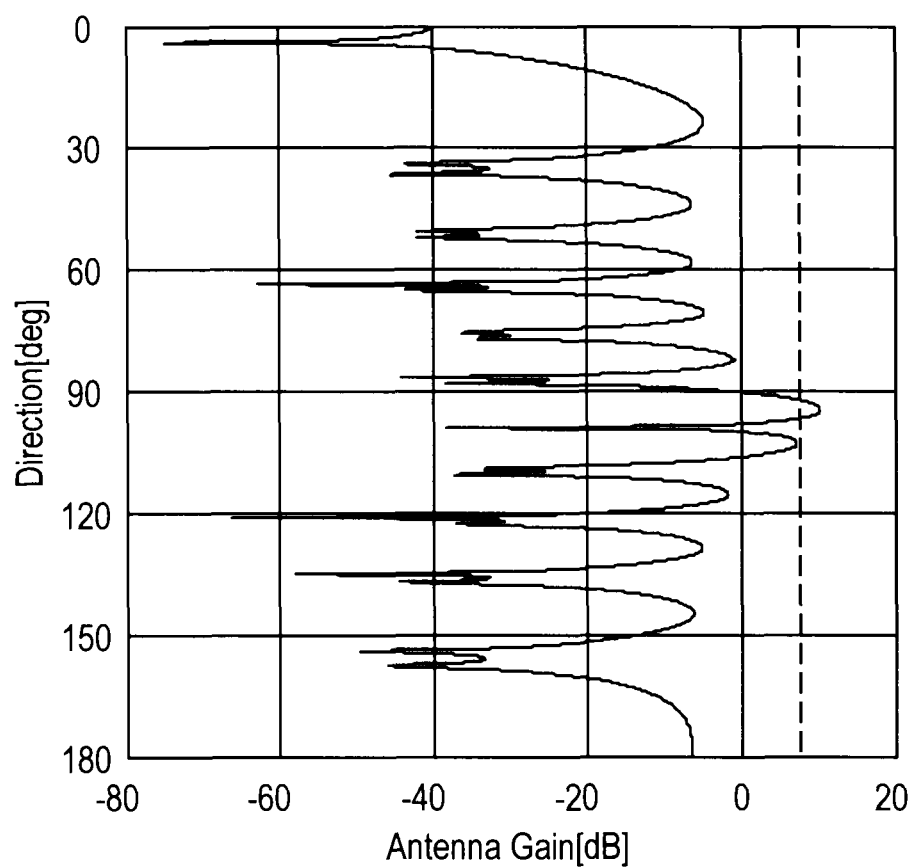
Figure 21:
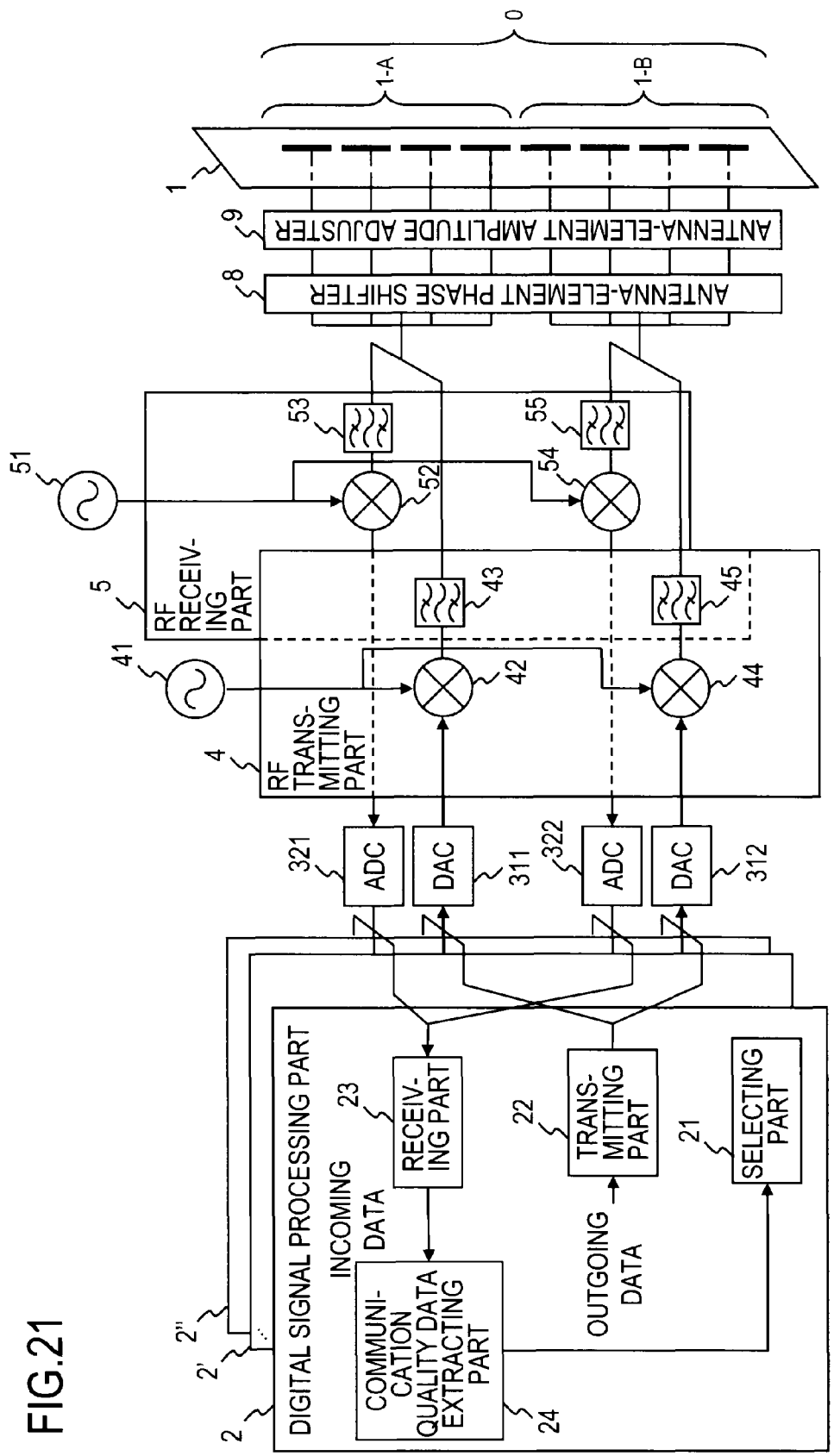
Figure 22:
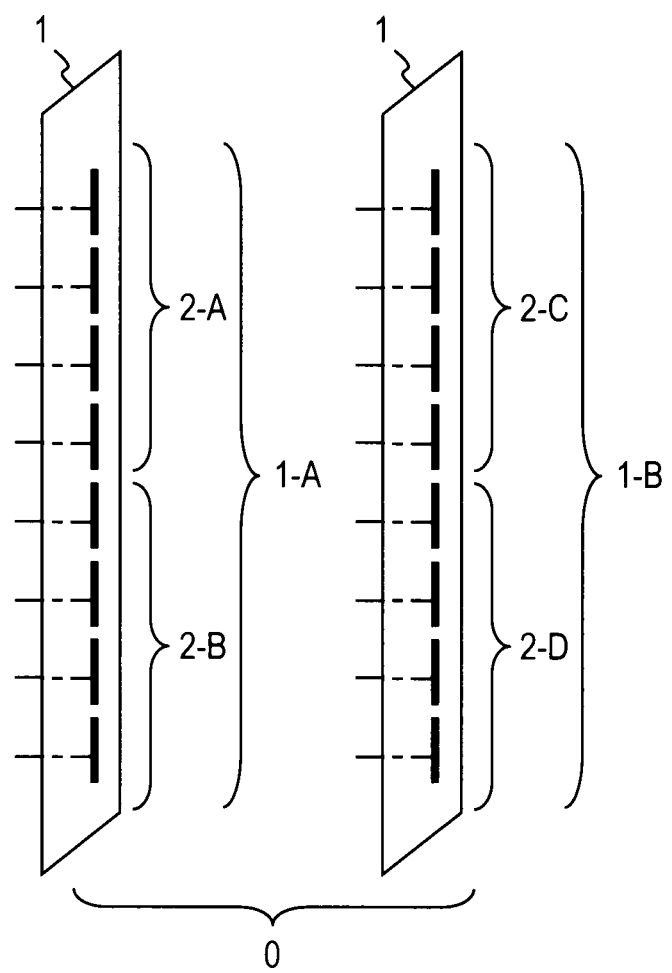
Figure 23:
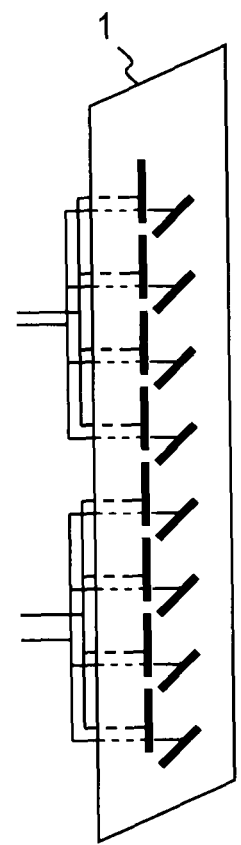
Figure 24:
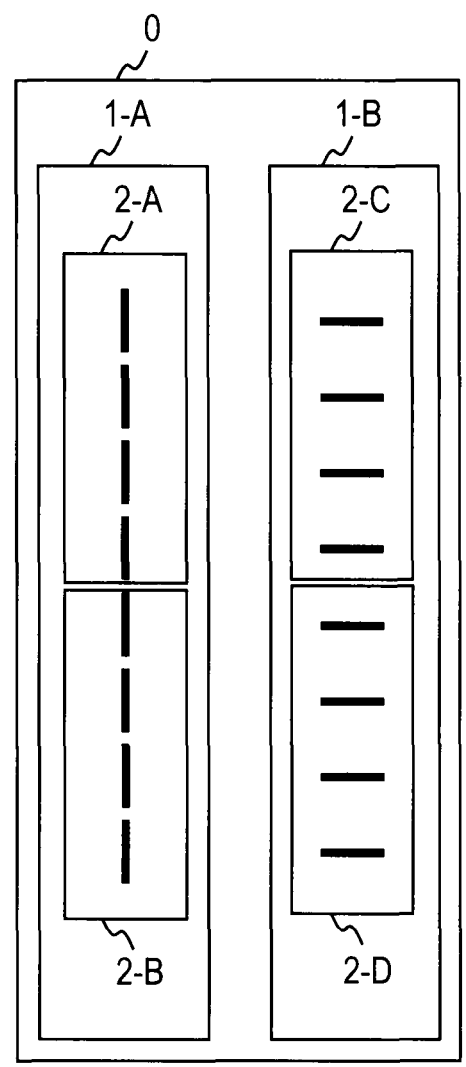

FIG. 7 is a functional block diagram of an example of an antenna equipment of a second embodiment;

FIG. 8 is a functional block diagram of an example of a transmitting part of the second embodiment;

FIG. 9 is a functional block diagram of an example of a receiving part of the second embodiment;

FIG. 10 is a diagram illustrating exemplary vertical directional characteristics of antenna elements 1-A of the second embodiment configured for the first communication type;

FIG. 11 is a diagram illustrating exemplary vertical directional characteristics of an antenna element 1-B of the second embodiment configured for the first communication type;

FIG. 12 is a diagram illustrating exemplary vertical directional characteristics of antenna elements 0 of the second embodiment configured for the second communication type;

FIG. 13 is a diagram illustrating exemplary vertical directional characteristics of antenna elements 2-A of the second embodiment configured for a third communication type;

FIG. 14 is a diagram illustrating exemplary vertical directional characteristics of antenna elements 2-B of the second embodiment configured for the third communication type;

FIG. 15 is a diagram illustrating exemplary vertical directional characteristics of antenna elements 2-C of the second embodiment configured for the third communication type;

FIG. 16 is a diagram illustrating exemplary vertical directional characteristics of antenna elements 2-D of the second embodiment configured for the third communication type;

FIG. 17 is a functional block diagram of an example of antenna equipment of a third embodiment;

FIG. 18 is a diagram illustrating exemplary vertical directional characteristics of antenna elements 1-A of the third embodiment configured for the first communication type;

FIG. 19 is a diagram illustrating exemplary vertical directional characteristics of antenna elements 1-B of the third embodiment configured for the first communication type;

FIG. 20 is a diagram illustrating exemplary vertical directional characteristics of antenna elements 0 of the third embodiment configured for the second communication type;

FIG. 21 is a functional block diagram of an example of an antenna equipment of a fourth embodiment;

FIG. 22 is a diagram illustrating a variation of the array antenna of any of the first to third embodiment;

FIG. 23 is a diagram illustrating another variation of the array antenna of any of the first to third embodiment; and FIG. 24 is a diagram illustrating exemplary groups of antenna elements that make up the array antenna in FIG. 23.

DETAILED DESCRIPTION OF THE EMBODIMENTS

First Embodiment

An antenna equipment of a first embodiment selects a set of one communication type and one group of antennas from two communication types and multiple groups of antenna elements according to the quality of communication with a mobile station. The antenna equipment uses the same array antenna to transmit and receive data to and from mobile stations. In the past, changing an existing SISO (Single-Input Single-Output) base station not supporting the MIMO transmission technology to a base station capable of using the MIMO has required installing array antennas equivalent to existing array antennas as many as or more than the number of MIMO branches in order to maintain an existing coverage area after the change. It is difficult to install array antennas as many as or more than the number of MIMO branches if space available for installing antennas is limited. Furthermore, reducing the size of array antennas to install more array antennas in order to provide required number of MIMO branches reduces the gain of each array antenna to such a level that cannot maintain an existing coverage area. By selecting an appropriate set of a communication type and an antenna element group according to an environment to perform communication, the number of branches can be increased while maintaining an existing coverage area with array antennas of the same size as exiting array antennas without installing array antennas more than or equal to the number of MIMO branches.

A first communication type is MIMO 2×2 transmission, where antenna elements making up an array antenna 1 are grouped into two to form two branches, which are used to perform communication. Since the two branches are used to provide MIMO 2×2 spatial multiplexing, high-speed communication can be accomplished with mobile stations in locations relatively close to the antenna equipment.

A second communication type is SISO transmission, where the antenna elements making up an array antenna 1 are used as one group to perform communication. The second communication type is effective for maintaining a coverage area because gains equivalent to those of an existing SISO base station can be obtained. For example, regular communication such as transmission of a notification signal is performed using the second communication type.

Figure 1:
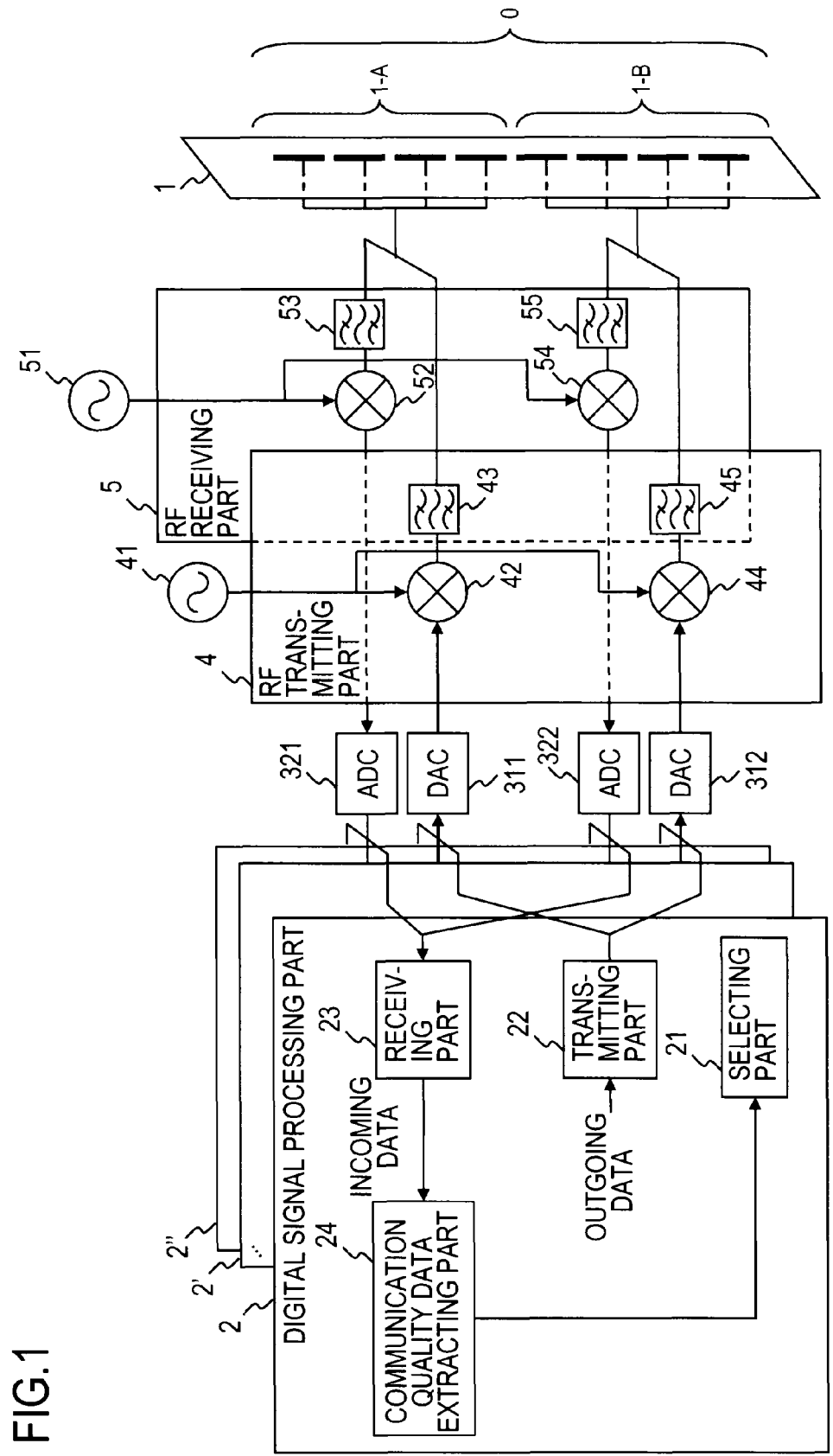
FIG. 1 is a functional block diagram of an example of an antenna equipment of a first embodiment.

The array antenna 1 includes eight antenna elements arranged in a vertical row, for example, as illustrated in FIG. 1. The antenna elements are grouped into at least one group according to one of multiple communication types.

For the first communication type, the eight antenna elements are grouped into two groups: one consisting of four antenna elements 1-A from the top and the other consisting of four antenna elements 1-B from the bottom. The top four antenna elements 1-A are associated with a first branch in the MIMO transmission and the bottom four antenna elements 1-B are associated with a second branch in the MIMO transmission.

For the second transmission type, the eight antennal elements make up one group 0.

A process for sending data from the antenna equipment to mobile stations will be described below.

As illustrated in FIG. 1, the antenna equipment includes an array antenna 1, digital signal processing parts 2, . . . , 2', 2", digital-analog converters 311 and 312, analog-digital converters 321 and 322, an RF transmitting part 4, an RF receiving part 5, local signal generators 41 and 51, for example. The antenna equipment includes at least as many digital signal processing parts 2, . . . , 2', 2" as the number of mobile terminals with which the base station concurrently communicate. One of the digital signal processing parts 2 which performs digital signal processing for one mobile station will be described below by way of illustration. The other digital signal processing parts perform digital signal processing for other mobile stations in the same way as the digital signal processing part 2.

The digital signal processing part 2 includes a selecting part 21, a transmitting part 22, a receiving part 23, and a communication quality data extracting part 24, for example, as illustrated in FIG. 1.

The selecting part 21 selects one of N communication types, where N is an integer greater than or equal to 2 (N=2 in this example). For example, the selecting part 21 selects a communication type that provides higher communication quality, on the basis of communication quality extracted by the communication quality data extracting part 24 from incoming data. For example, if the communication quality data is a measure indicating communication quality, such as the signal-to-noise ratio or reception level of communication, the value of the measure can be compared with a predetermined threshold value to determine the quality of the communication. Information concerning the selected communication type is sent to the transmitting part 22 and the receiving part 23. Based on the information concerning the selected communication type, switches 221 and 231 in the transmitting part 22 and the receiving part 23, respectively, are switched.

Figure 2:
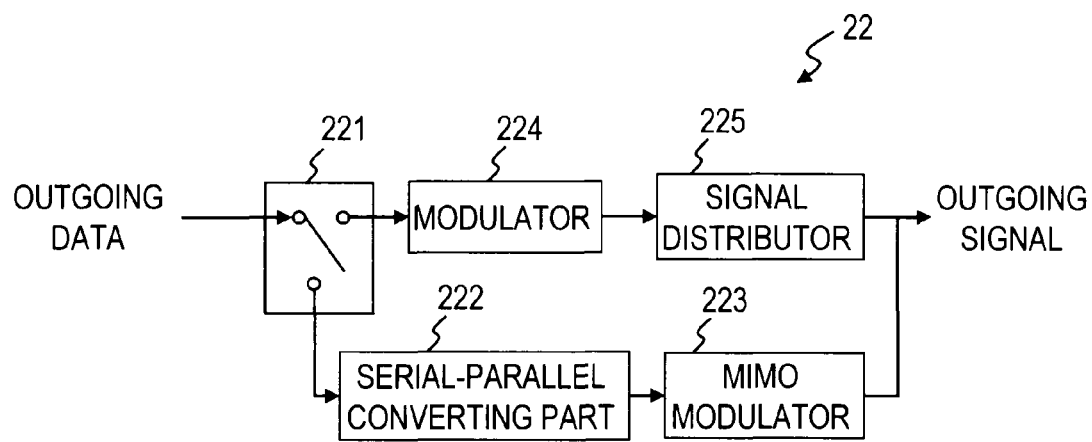
FIG. 2 is a functional block diagram of an example of a transmitting part of the first embodiment.

The transmitting part 22 modulates outgoing data to generate an outgoing signal for antenna element or antenna elements belonging to each group for the selected communication type. As illustrated in FIG. 2, the transmitting part 22 of the first embodiment includes the switch 221, a serial-parallel converting part 222, a MIMO modulator 223, a modulator 224, and a signal distributor 225, for example.

When the first communication type is selected, the switch 221 is turned to allow outgoing data to be input into the serial-parallel converting part 222. The serial-parallel converting part 222 converts the outgoing data to parallel outgoing data. The MIMO modulator 223 modulates each piece of the parallel outgoing data to generate an outgoing signal for the antenna elements 1-A and an outgoing signal for the antenna elements 1-B. The outgoing signal for the antenna elements 1-A is sent to the digital-analog converting part 311 and the outgoing signal for the antenna element 1-B is sent to the digital-analog converting part 312. The digital-analog converters are abbreviated as DAC in FIG. 1.

When the second communication type is selected, the switch 221 is turned to allow outgoing data to be input into the modulator 224. The modulator 224 modulates the outgoing data. The signal distributor 225 sends the same modulated outgoing data to both of the digital-analog converters 311 and 312.

Each of the digital-analog converters 311 and 312 converts the outgoing signal which is the digital signal input in them to an analog signal. The resulting analog signal is sent to the RF transmitting part 4.

The RF transmitting part 4 includes mixers 42 and 44 and duplexers 43 and 45, for example, as illustrated in FIG. 1. The mixers 42 and 44 convert the digital signals sent from the digital-analog converters 311 and 312, respectively, to signals in an outgoing carrier frequency band by using a local signal generated by the local signal generator 41. The converted signals are applied to the array antenna 1 through the duplexers 43 and 45. Specifically, the signal from the duplexer 43 is applied to the antenna elements 1-A and the signal from the duplexer 45 is applied to the antenna elements 1-B.

The signals applied to the antenna elements are transmitted to mobile stations through space. The downlink transmission is completed with this transmission.

A process for transmitting data from mobile stations to the antenna equipment will be described below.

Signals received at the array antenna 1 are sent to the RF receiving part 5.

The RF receiving part 5 includes mixers 52 and 54 and duplexers 53 and 55, for example, as illustrated in FIG. 1. The signals received at the antenna elements 1-A are sent to the mixer 52 through the duplexer 53; the signals received at the antenna elements 1-B are sent to the mixer 54 through the duplexer 55. The mixers 52 and 54 convert the signals from the duplexers 53 and 55, respectively, to signals in a baseband by using a local signal generated by the local signal generator 51. The converted incoming signals are sent to the analog-digital converters 321 and 322.

The analog-digital converters 321 and 322 convert the signals from the mixers 52 and 54, respectively, to digital incoming signals. The incoming signals are sent to the receiving part 23. The analog-digital converters are abbreviated as ADC in FIG. 1.

Figure 3:
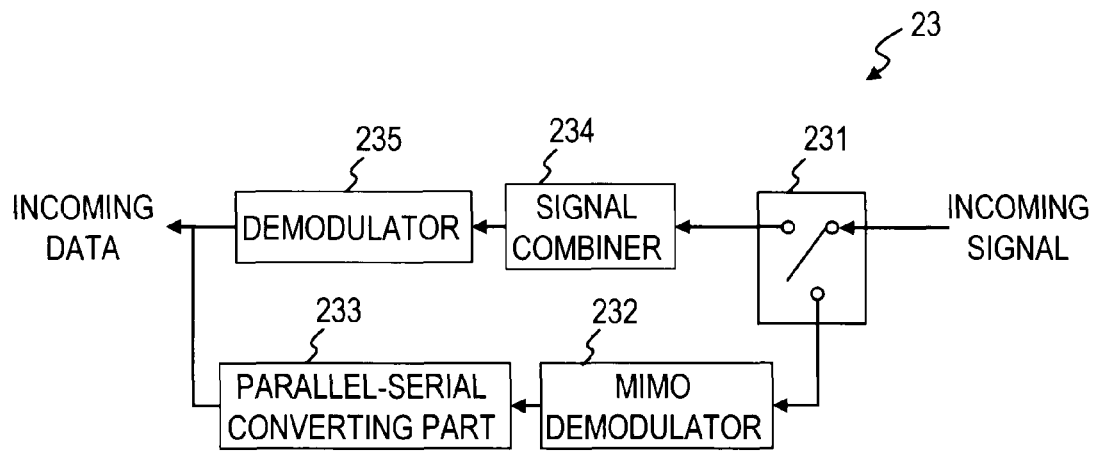
FIG. 3 is a functional block diagram of an example of a receiving part of the first embodiment.

The receiving part 23 demodulates the incoming signals from antenna element or antenna elements belonging to the group for a selected communication type to generate incoming data. The generated incoming data is sent to the communication quality data extracting part 24. As illustrated in FIG. 3, the receiving part 23 includes a switch 231, a MIMO demodulator 232, a parallel-serial converting part 233, a signal combiner 234 and a demodulator 235, for example.

When the first communication type is selected, the switch 231 is turned to allow the incoming signals to be input into the MIMO demodulator 232. The MIMO demodulator 232 demodulates the incoming signal from the antenna elements 1-A and the incoming signal from the antenna elements 1-B separately. The incoming signal from the antenna elements 1-A is the incoming signal from the analog-digital converting part 321 and the incoming signal from the antenna elements 1-B is the incoming signal from the analog-digital converting part 322. The demodulated signals are sent to the parallel-serial converting part 233.

The parallel-serial converting part 233 converts the demodulated signals to serial signals and outputs them as incoming data.

When the second communication type is selected, the switch 231 is turned to allow the incoming signals to be input in the signal combiner 234. The signal combiner 234 combines the incoming signals received at the antenna elements 1-A with the incoming signals received at the antenna elements 1-B. The combined incoming signal is sent to the demodulator 235. The demodulator 235 demodulates the combined signal and outputs the demodulated signal as incoming data.

The communication quality data extracting part 24 extracts communication quality data, which is data concerning the quality of the communication, from the incoming data. The extracted communication quality data is sent to the selecting part 21.

Figure 4:
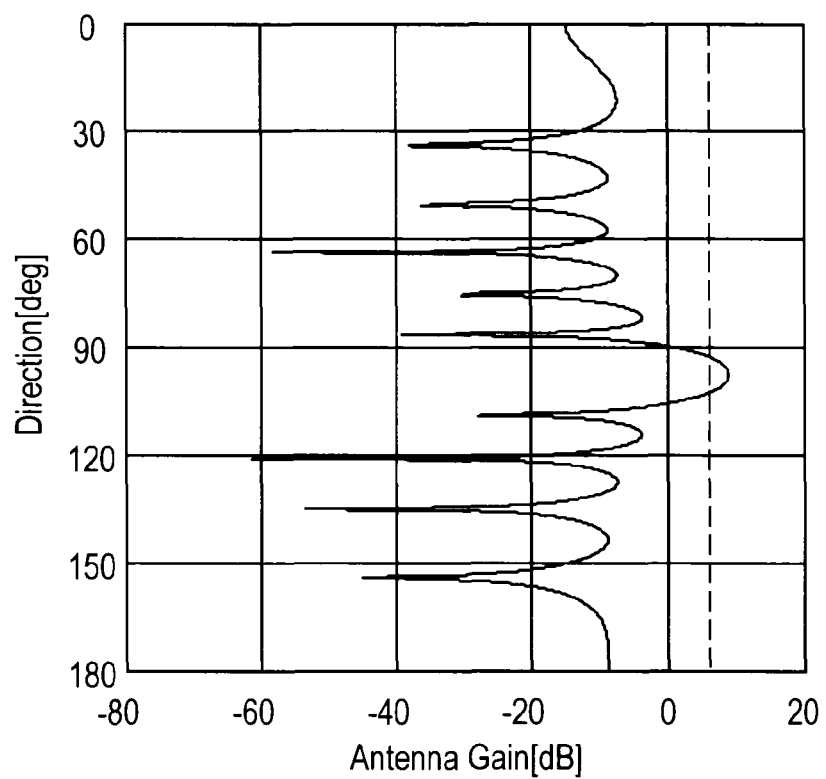
FIG. 4 is a diagram illustrating exemplary vertical directional characteristics of antenna elements 1-A of the first embodiment configured for a first communication type.
Figure 5:
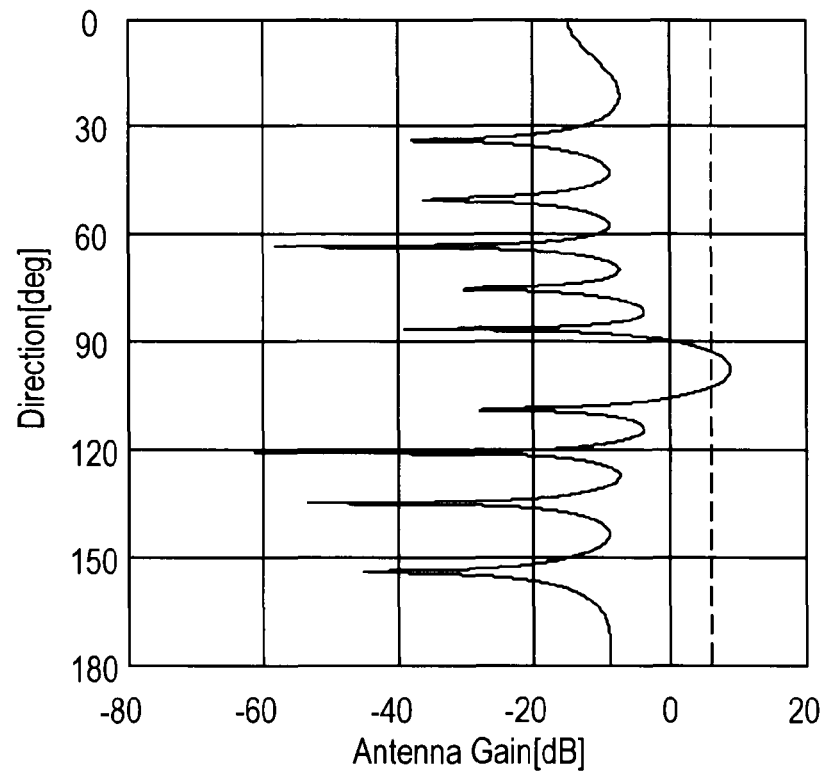
FIG. 5 is a diagram illustrating exemplary vertical directional characteristics of antenna elements 1-B of the first embodiment configured for the first communication type.
Figure 6:
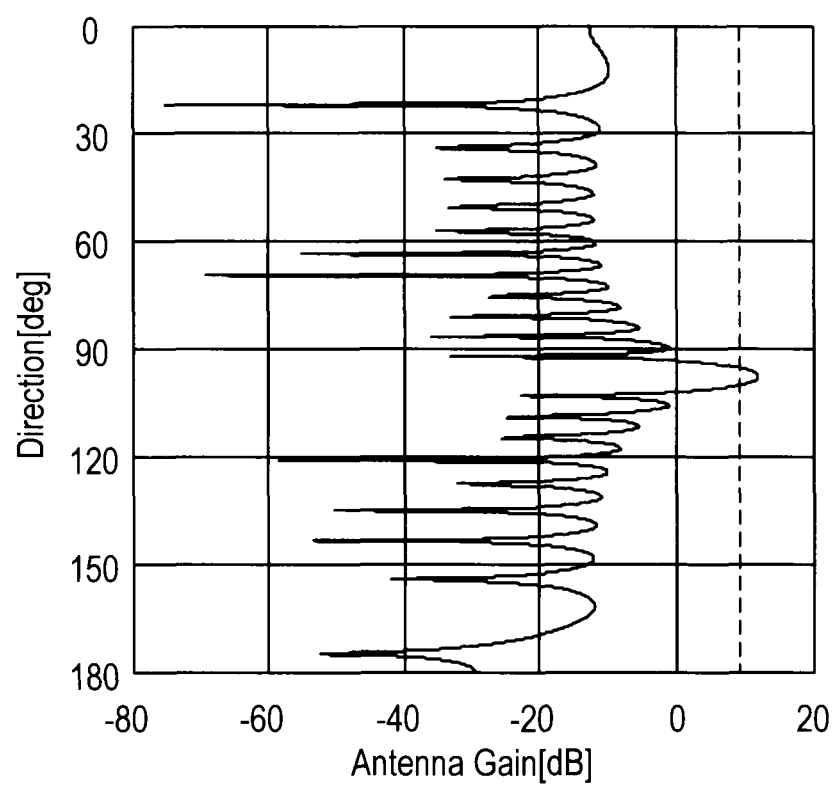
FIG. 6 is a diagram illustrating exemplary vertical directional characteristics of antenna elements 0 of the first embodiment configured for a second communication type.

FIGS. 4 and 5 illustrate exemplary vertical directional characteristics of the antenna elements when the first communication type is selected in the antenna equipment of the first embodiment. FIG. 4 illustrates exemplary vertical directional characteristics of the antenna elements 1-A and FIG. 5 illustrates exemplary vertical directional characteristics of the antenna elements 1-B. FIG. 6 illustrates exemplary vertical directional characteristics when the second communication type is selected. The antenna elements making up the array antenna 1 are disposed vertically and the antenna elements 1-A are located above the antenna elements 1-B. The vertical axis of each graph illustrating the vertical directional characteristics represents angles from the top (0 degrees) toward the bottom (180 degrees) in the vertical direction. The dashed line of each graph of the vertical directional characteristics indicates the position of a gain −3 dB smaller than the peak gain.

Using the same array antenna for communications of multiple types in this way eliminates the need for installing different antennas for different communication types.

Second Embodiment

The antenna equipment of the first embodiment selects one of the two communication types to perform communication whereas an antenna equipment of a second embodiment selects one from three communication types to perform communication. As in the second embodiment, one antenna equipment may support three or more communication types.

The following description will focus on differences from the first embodiment. Description of the same elements as those in the first embodiment will be omitted.

First and second communication types in the second embodiment are the same as those in the first embodiment. In the second embodiment, a third communication type is also available. The third communication type is MIMO 4×4 transmission.

For the third communication type, eight antenna elements making up an array antenna 1 are grouped into four groups: a group consisting of the first and second antenna elements 2-A from the top, a group consisting of the third and fourth antenna elements 2-B from the top, a group consisting of the fifth and sixth antenna elements 2-C from the top, and a group consisting of the seventh and eighth antenna elements 2-D from the top as illustrated in FIG. 7. For the third communication type, four branches formed by the antenna elements 2-A, 2-B, 2-C and 2-D are used to perform MIMO 4×4 transmission. Accordingly, faster communications than communications of the first and second types can be performed with mobile stations near the antenna equipment.

A transmitting part 22 of the second embodiment further includes a 4-branch serial-parallel converting part 226 and a 4-branch MIMO modulator 227 as illustrated in FIG. 8. When the third communication type is selected by a selecting part 21, a switch 221 is turned to allow outgoing data to be input into the 4-branch serial-parallel converting part 226. The 4-branch serial-parallel converting part 226 converts input outgoing data into parallel form. The 4-branch MIMO modulator 227 modulates each piece of the parallel outgoing data to generate an outgoing signal to be applied to the antenna elements 2-A, an outgoing signal to be applied to the antenna elements 2-B, an outgoing signal to be applied to the antenna elements 2-C and an outgoing signal to be applied to the antenna elements 2-D.

The outgoing signal to be applied to the antenna elements 2-A is converted by a digital-analog converting part 311 to an analog signal, which is then converted by a mixer 42 to a signal in an outgoing carrier frequency band, then applied to the antenna elements 2-A through a duplexer 43. The outgoing signal to be applied to the antenna elements 2-B is converted by a digital-analog converting part 312 to an analog signal, which is then converted by a mixer 44 to a signal in an outgoing carrier frequency band, then applied to the antenna elements 2-B through a duplexer 45. The outgoing signal to be applied to the antenna elements 2-C is converted by a digital-analog converting part 313 to an analog signal, which is then converted by a mixer 46 to a signal in an outgoing carrier frequency band, then applied to the antenna elements 2-C through a duplexer 47. The outgoing signal to be applied to the antenna elements 2-D is converted by a digital-analog converting part 314 to an analog signal, which is then converted by mixer 48 to a signal in an outgoing carrier frequency band, then applied to the antenna elements 2-D through a duplexer 49. The downlink transmission is completed with transmission of the signals.

Signals received at the antenna elements 2-A are input into a mixer 52 through a duplexer 53, converted to signals in a baseband by the mixer 52, then converted to digital signals by analog-digital converting part 321, and input into a receiving part 23 as incoming signals from to the antenna elements 2-A. Signals received at the antenna elements 2-B are input into a mixer 54 through a duplexer 55, converted to signals in a baseband by the mixer 54, then converted to digital signals by an analog-digital converting part 322, and input in the receiving part 23 as incoming signals from to the antenna elements 2-B. Signals received at the antenna elements 2-C are input in a mixer 56 through a duplexer 57, converted to signals in a baseband by the mixer 56, then converted to digital signals by an analog-digital converting part 323, and input in the receiving part 23 as incoming signals from to the antenna elements 2-C. Signals received at the antenna elements 2-D are input into a mixer 58 through a duplexer 59, converted to signals in a baseband by the mixer 58, then converted to digital signals by an analog-digital converting part 324, and input in the receiving part 23 as incoming signals from to the antenna elements 2-D.

The receiving part 23 of the second embodiment further includes a 4-branch MIMO demodulator 236 and a 4-branch parallel-serial converting part 237 as illustrated in FIG. 9. When the third communication type is selected by the selecting part 21, a switch 231 is turned to allow incoming signals from the analog-digital converters 321, 322, 323 and 324 to be input in the 4-branch MIMO demodulator 236. The 4-branch MIMO demodulator 236 demodulates incoming signals from the antenna elements 2-A, incoming signals from the antenna elements 2-B, incoming signals from the antenna elements 2-C, and incoming signals from the antenna elements 2-D separately. The demodulated signals are sent to the 4-branch MIMO parallel-serial converting part 237.

The 4-branch parallel-serial converting part 237 converts the demodulated signals to serial signals and output the signals as incoming data. The uplink communication is completed with the conversion.

FIGS. 10 and 11 illustrate exemplary vertical directional characteristics of the antenna elements when the first communication type is selected in the antenna equipment of the second embodiment. FIG. 10 illustrates exemplary vertical directional characteristics of the antenna elements 1-A and FIG. 11 illustrates exemplary vertical directional characteristics of the antenna elements 1-B. FIG. 12 illustrates exemplary vertical directional characteristics of the antenna elements when the second communication type is selected. FIGS. 13 to 16 illustrate exemplary vertical directional characteristics when the third communication type is selected. FIG. 13 illustrates exemplary vertical directional characteristics of the antenna elements 2-A, FIG. 14 illustrates exemplary vertical directional characteristics of the antenna elements 2-B, FIG. 15 illustrates exemplary vertical directional characteristics of the antenna elements 2-C, and FIG. 16 illustrates exemplary vertical directional characteristics of the antenna elements 2-D.

Third Embodiment

As illustrated in FIG. 17, an antenna equipment of a third embodiment further includes a sub-array phase shifter 6 which adjusts the amount of phase shift of outgoing and incoming signals and a sub-array amplitude adjuster 7 which adjusts the amplitudes of outgoing and incoming signals. FIG. 17 illustrates an exemplary antenna equipment of the third embodiment which has a sub-array phase shifter 6 and a sub-array amplitude adjuster 7 in addition to the components of the antenna equipment of the first embodiment. The rest of the antenna equipment is the same as the antenna equipments of the first and second embodiments.

Here, the outgoing signal is a signal generated by a transmitting part 22 and the incoming signal is a signal from an analog-digital converting part.

The sub-array phase shifter 6 and the sub-array amplitude adjuster 7 adjust the phase and amplitude to desired values based on communication quality data extracted by a communication quality data extracting part 24.

Since the phases and amplitudes of outgoing and incoming signals are made adjustable in this way, the size of the coverage area of the array antenna 1 can be adjusted to each communication type, thus increasing the flexibility of the antenna equipment. In general, decreasing the number of antenna elements making up a branch makes the vertical beam wider. By changing the phase and amplitude to change the radiation angle of a radio wave transmitted and received by the array antenna 1, the coverage area of the array antenna 1 can be maintained the same when a change is made from one communication type to another.

FIGS. 18 and 19 illustrate exemplary vertical directional characteristics of the antenna elements when the first communication type is selected in the antenna equipment of the third embodiment. FIG. 18 illustrates exemplary vertical directional characteristics of the antenna elements 1-A and FIG. 19 illustrates exemplary vertical directional characteristics of the antenna elements 1-B. FIG. 20 illustrates exemplary vertical directional characteristics when the second communication type is selected.

One of the sub-array phase shifter 6 and the sub-array amplitude adjuster 7 may be omitted.

Fourth Embodiment

As illustrated in FIG. 21, an antenna equipment of a fourth embodiment further includes an antenna-element phase shifter 8 which adjusts the amount of phase of a signal to be sent to each antenna element and the amount of a signal from each antenna element and an antenna-element amplitude adjuster 9 which adjusts the amplitude of a signal to be sent to each antenna element and the amplitude of a signal from each antenna element. FIG. 21 illustrates an example of an antenna equipment of the fourth embodiment which includes an antenna-element phase shifter 8 and an antenna-element amplitude adjuster 9 in addition to the components of the antenna equipment of the first embodiment. The rest of the antenna equipment is the same as the antenna equipments of the first and second embodiments.

The antenna-element phase shifter 8 and the antenna-element amplitude adjuster 9 adjust the phase and amplitude to desired values based on communication quality data extracted by a communication quality data extracting part 24, for example.

Since the phases and amplitudes of outgoing and incoming signals to and from antenna elements are made adjustable in this way, the size of the coverage area of the array antenna 1 can be adjusted to each communication type, thus increasing the flexibility of the antenna equipment.

One of the antenna-element phase shifter 8 and the antenna-element amplitude adjuster 9 may be omitted.

VARIATIONS

The present invention is not limited to the embodiments described above. Modifications can be made to the embodiments as appropriate without departing from the spirit of the present invention.

For example, while the array antenna 1 of the embodiments described above includes eight antenna elements, the array antenna 1 may include any number of antenna elements greater than two. The antenna elements making up the array antenna 1 do not necessarily need to be arranged in a vertical row. While the antenna equipments of the embodiments depicted use FDD (Frequency Division duplex), the present invention can be applied to a TDD (Time Division Duplex) system as well. The antenna elements may be arranged in two or more rows as illustrated in FIG. 22. In this case, the antenna elements are grouped according to each communication type as illustrated in FIG. 22, for example. In the example in FIG. 22, for the first communication type, the antenna elements in the left-hand row are grouped as 1-A and the antenna elements in the right-hand row are grouped as 1-B. For the second communication type, all antenna elements are grouped as 0. For the third communication type, the antenna elements in the upper half part of the left-hand row are grouped as 2-A, the antenna elements in the lower half part of the left-hand row are grouped as 2-B, the antenna elements in the upper half part of the right-hand row are grouped as 2-C, and the antenna elements in the lower half part of the right-hand row are grouped as 2-D.

The grouping of the antenna elements illustrated in FIGS. 1, 7, 17, 21 and 22 are illustrative only. The antenna elements may be grouped in any manner as long as each group includes at least one antenna element. For example, adjacent antenna elements do not necessarily need to be grouped into the same group and nonadjacent antenna elements may be grouped into the same group.

While the antenna elements in each row are grouped into upper and lower half groups to provide four branches in the example in FIG. 22, the antenna elements in each row may be grouped into three to provide six branches, for example. Furthermore, the antenna elements in each row may be grouped into four or more groups. The same applies to antenna elements arranged in three or more rows.

The array antenna 1 may be a polarized array antenna. That is, the array antenna 1 may include vertical antenna elements and horizontal antenna elements as illustrated in FIG. 23. In this case, the vertical and horizontal antenna elements are grouped as illustrated in FIG. 24. In the example in FIG. 24, for the first communication type, the vertical antennas are grouped as 1-A and the horizontal antennas are grouped as 1-B. For the second communication type, all of the vertical and horizontal antenna elements are grouped as 0. For the third communication type, the vertical antenna elements in the upper half part are grouped as 2-A, the vertical antenna elements in the lower half part are grouped as 2-B, the horizontal antenna elements in the upper half part are grouped as 2-C and the horizontal antenna elements in the lower half part are grouped as 2-D.

The polarized array antenna can produce a diversity effect.

What is claimed is:

1. An antenna equipment comprising:

an array antenna comprising a plurality of antenna elements configured to be grouped into at least one group according to each of N communication types, where N is an integer equal to or greater than 2, the N communication types being one Single-Input-Single-Output (SISO) transmission type and N−1 Multiple-Input-Multiple-Output (MIMO) transmission type or transmission types different from each other, each of the N−1 MIMO transmission type or transmission types using all of the plurality of antenna elements;

a selecting part selecting one of the N communication types;

a transmitting part modulating outgoing data to generate an outgoing signal for antenna element or antenna elements belonging to each group for the selected communication type; and a receiving part demodulating an incoming signal from antenna element or antenna elements belonging to each group for the selected communication type to generate incoming data.

2. The antenna equipment according to claim 1, wherein:

the array antenna includes a plurality of antenna elements arranged in a plurality of rows or a single row; and when the antenna elements are grouped into a plurality of groups, the antenna elements in each row are grouped into the plurality of groups.

3. The antenna equipment according to claim 1, further comprising:

a sub-array phase shifter adjusting the amount of phase shift of the outgoing signal and the amount of phase shift of the incoming signal; and a sub-array amplitude adjuster adjusting the amplitude of the outgoing signal and the amplitude of the incoming signal.

4. The antenna equipment according to claim 1, further comprising:

an antenna-element phase shifter adjusting the amount of phase shift of a signal to be provided to each of the antenna elements and the amount of phase shift of a signal from each of the antenna elements; and an antenna-element amplitude adjuster adjusting the amplitude of the signal to be provided to each of the antenna elements and the amplitude of the signal from each of the antenna elements.

5. The antenna equipment according to claim 1, wherein N is equal to or greater than 3.

* * * * *